J. B. Hay,
Glass Furnace.
Nº 29,342.    Patented July 24, 1860.
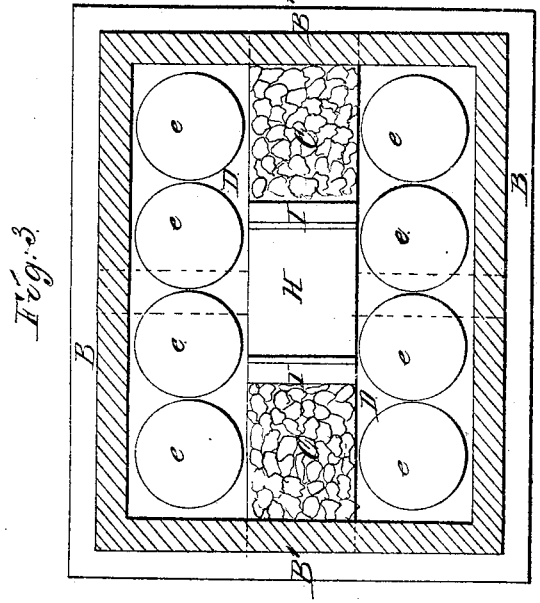
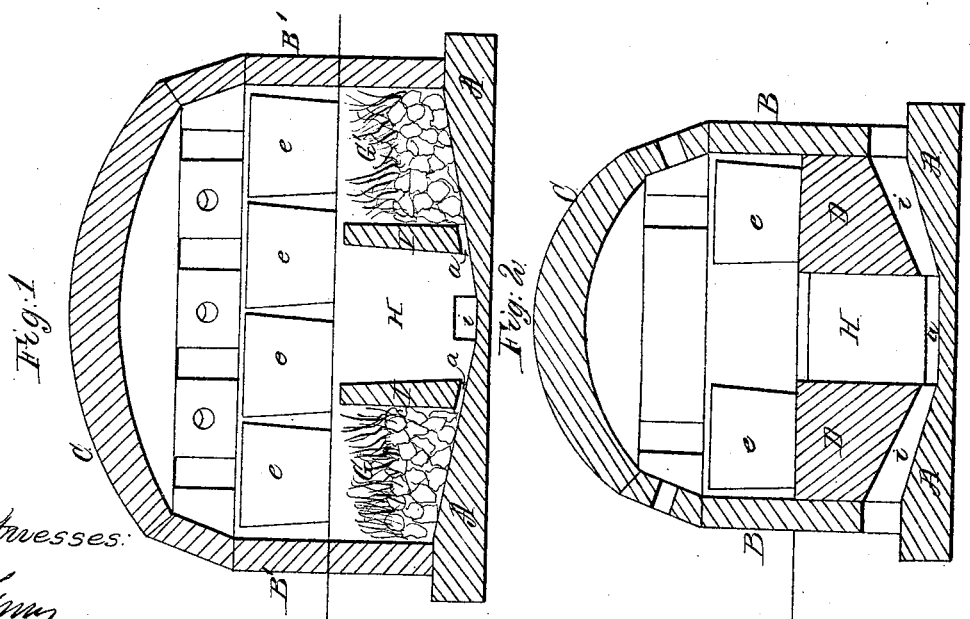

UNITED STATES PATENT OFFICE.

JOHN B. HAY, OF WINSLOW, NEW JERSEY, ASSIGNOR TO HAY & CO., OF SAME PLACE.

GLASS-FURNACE.

Specification of Letters Patent No. 29,342, dated July 24, 1860.

*To all whom it may concern:*

Be it known that I, J. B. HAY, of Winslow, in the county of Camden and State of New Jersey, have invented a new and useful Improvement in Glass-Furnaces; and I do hereby declare the following to be a full, clear, and exact description of the same, reference being had to the accompanying drawing and to the letters of reference marked thereon.

My invention consists of three compartments with inclined bases, certain partitions with openings near the base, and certain inclined side openings, the whole being arranged within the walls of a glass furnace in respect to its benches in the manner described hereafter so that the glass which escapes from the crucibles may find its way into the central compartment from which it may be withdrawn in a state free from all admixture with ashes and other refuse prior to being again deposited in the crucibles.

In order to enable others to make and use my invention, I will now proceed to describe its construction and operation.

On reference to the accompanying drawing which forms part of this specification, Figure 1 is a longitudinal sectional elevation of my improved furnace. Fig. 2 a transverse sectional, elevation and Fig. 3 a ground plan.

Similar letters refer to similar parts throughout the several views.

A represents the base, B, B the side walls, B' B' the end walls, and C the arched roof of my improved glass furnace, within which are built two benches D D, one against the inside of one side wall, and the other against the inside of the opposite wall.

Between the two benches intervenes an open space, which is separated into the three compartments G, G', and H, by the two partitions I I which extend nearly to the top of the benches but between each of which and the base is an opening $a$, so that both the compartments G and G' may communicate with the central compartment H.

The bottom of the compartments inclines downward toward the middle, as seen in Fig. 1, and through each bench as well as through each side of the furnace is an inclined passage $i$, each passage taking a course at right angles or thereabout to the benches and communicating with the central compartment H between the two partitions.

The pots or crucibles $e$ are placed in a row on each bench and above these crucibles and in the sides and ends of the furnace are any suitable number of the usual openings through which the operators insert their rods or other implements for withdrawing the molten glass from the crucibles, the openings being furnished with suitable covers easily removed and replaced.

The fuel is contained in the two compartments G and G' which have suitable openings in the end walls of the furnace, the openings being furnished with the usual detachable doors. The openings of the passages $i$ are also furnished with detachable doors so as to exclude the air when necessary.

In glass furnaces the molten contents of the crucibles are apt to escape and fall onto the fuel where the glass becomes so amalgamated with the cinders and ashes that when cool it can only be separated from the refuse with much labor consequently much valuable material is lost. This loss is obviated by my improved furnace, in the following manner. The molten glass which escapes from the crucibles onto the benches falls, either among the fuel in the two compartments G and G' or onto the empty central compartment H. The greater portion of the glass which finds its way into the fuel percolates through the latter and passes down the inclined base into the central compartment H where a mass of molten glass accumulates which can be removed at pleasure by suitable scoops or ladles.

It will thus be seen that my improvement affords a means of collecting the glass which escapes from the crucibles and of collecting the glass in a state free from ashes and other impurities ready to be again placed in the crucibles.

I claim as my invention and desire to secure by Letters Patent—

The three compartments G G' and H with their inclined bases, the partitions I I, with their openings *a a* near the base and the inclined side openings *i i* the whole being arranged within the walls of the furnace in respect to the benches D D as and for the purpose herein set forth.

In testimony whereof, I have signed my name to this specification, in the presence of two subscribing witnesses.

J. B. HAY.

Witnesses:
  HENRY HOWSON,
  CHARLES D. FREEMAN.